United States Patent
Lee

(10) Patent No.: US 9,247,121 B2
(45) Date of Patent: Jan. 26, 2016

(54) IMAGE SENSOR, ELECTRIC DEVICE USING THE SAME AND FOCUSING METHOD OF THE ELECTRIC DEVICE

(71) Applicant: ABILITY ENTERPRISE CO., LTD., Taipei (TW)

(72) Inventor: Jong-Tae Lee, Taipei (TW)

(73) Assignee: ABILITY ENTERPRISE CO., LTD., Taipei (TW)

( * ) Notice: Subject to any disclaimer, the term of this patent is extended or adjusted under 35 U.S.C. 154(b) by 182 days.

(21) Appl. No.: 13/870,645

(22) Filed: Apr. 25, 2013

(65) Prior Publication Data

US 2014/0320729 A1 Oct. 30, 2014

(51) Int. Cl.
*H04N 5/232* (2006.01)
*H04N 5/225* (2006.01)
*G02B 27/10* (2006.01)

(52) U.S. Cl.
CPC ......... *H04N 5/23212* (2013.01); *H04N 5/2254* (2013.01)

(58) Field of Classification Search
CPC .................................................. H04N 5/23212
USPC ........ 348/222.1, 302, 335, 345, 362; 359/626
See application file for complete search history.

(56) References Cited

U.S. PATENT DOCUMENTS

| | | | |
|---|---|---|---|
| 6,556,349 B2 * | 4/2003 | Cox .................... | G02B 6/12002 257/E31.128 |
| 6,638,786 B2 * | 10/2003 | Yamamoto ........ | H01L 27/14685 438/57 |
| 8,558,940 B2 * | 10/2013 | Kusaka .............. | H04N 5/23212 348/345 |
| 2009/0200623 A1 | 8/2009 | Qian et al. | |
| 2009/0219423 A1 * | 9/2009 | Suzuki .......................... 348/302 | |
| 2012/0104525 A1 * | 5/2012 | Wu ....................... | G02B 3/0018 257/432 |
| 2012/0194714 A1 * | 8/2012 | Yamashita ........ | H01L 27/14627 348/294 |

* cited by examiner

*Primary Examiner* — Trung Diep
(74) *Attorney, Agent, or Firm* — Rabin & Berdo, P.C.

(57) ABSTRACT

An image sensor, an electric device using the same and a focusing method of the electric device are provided. The image sensor comprises a plurality of image capturing units and a detecting unit. Each image capturing unit includes an image capturing pixel and a first micro lens. The first micro lens is disposed in front of the image capturing pixel. The detecting unit has a focus detecting pixel and a second micro lens. The second micro lens is disposed in front of the image detecting pixel. A length of the second micro lens is different from a length of the first micro lenses.

20 Claims, 4 Drawing Sheets

110

C2
↑
└→C1

| | | | | | | | | | | | |
|---|---|---|---|---|---|---|---|---|---|---|---|
| | -5 | -4 | -3 | -2 | -1 | 0 | 1 | 2 | 3 | 4 | 5 |
| | -5 | -4 | -3 | -2 | -1 | 0 | 1 | 2 | 3 | 4 | 5 |
| | -5 | -4 | -3 | -2 | -1 | 0 | 1 | 2 | 3 | 4 | 5 |
| | -5 | -4 | -3 | -2 | -1 | 0 | 1 | 2 | 3 | 4 | 5 |
| | -5 | -4 | -3 | -2 | -1 | 0 | 1 | 2 | 3 | 4 | 5 |
| | -5 | -4 | -3 | -2 | -1 | 0 | 1 | 2 | 3 | 4 | 5 |
| | -5 | -4 | -3 | -2 | -1 | 0 | 1 | 2 | 3 | 4 | 5 |
| | | | | | | | | | | | |

IMAGE SENSOR, ELECTRIC DEVICE USING THE SAME AND FOCUSING METHOD OF THE ELECTRIC DEVICE

BACKGROUND

1. Technical Field

The disclosure relates in general to a sensor, a device using the same and a processing method of the device, and more particularly to an image sensor, an electric device using the same and a focusing method of the electric device.

2. Description of the Related Art

Along with the development in camera technology, various digital cameras are invented. The digital camera does not need any film, thus the digital camera has been popular in public.

The digital camera includes a sensor chip for receiving the light beams reflected from an object and capturing an image of the object. The image of the object can be recorded forever and can be shown on a display without being print on a photo paper.

In the digital camera, an autofocus process is applied for automatic focusing the image. The accuracy and the time consumption of the autofocus process are important for shooting the image. If the accuracy of the autofocus process is not good, then the image might be obscured. If the time consumption of the autofocus process is large, then the digital camera cannot capture a fast moving object.

SUMMARY

The disclosure is directed to an image sensor, an electric device using the same and a focusing method of the electric device. Various lengths of a plurality of micro lenses are applied on a plurality of detecting units, such that in an autofocus process, the time consumption can be reduced, and the accuracy can be improved.

According to one aspect of the present disclosure, an image sensor is provided. The image sensor comprises a plurality of image capturing units and a detecting unit. Each image capturing unit includes an image capturing pixel and a first micro lens. The first micro lens is disposed in front of the image capturing pixel. The detecting unit has a detecting pixel and a second micro lens with various focal lengths. The second micro lens is disposed in front of the image detecting pixel. A length of the second micro lens is different from a length of the first micro lenses.

According to another aspect of the present disclosure, an electric device is provided. The electric device comprises an image sensor. The image sensor comprises a plurality of image capturing units and a detecting unit. Each image capturing unit includes an image capturing pixel and a first micro lens. The first micro lens is disposed in front of the image capturing pixel. The detecting unit has a detecting pixel and a second micro lens. The second micro lens is disposed in front of the image detecting pixel. A length of the second micro lens is different from a length of the first micro lenses.

According to another aspect of the present disclosure, an electric device is provided. The electric device comprises an image sensor, a computing unit, a lens module and a motor. The image sensor includes a plurality of image capturing units and a plurality of detecting units. Each image capturing unit has an image capturing pixel and a first micro lens. Each detecting units has a detecting pixel and a second micro lens with various focal lengths. The second micro lenses have different lengths. The computing unit receives an error data, such as a de-focus data, provided by the detecting units and provides a movement data of the lens module. A built-in table which comprises a plurality of movement data of the lens module in comparison with the error data is build-in the computing unit for the motor to drive the lens module to move.

According to the other aspect of the present disclosure, a focusing method of an electric device is provided. The electric device comprises an image sensor, a computer unit and a lens module. The image sensor includes a plurality of image capturing units and a plurality of detecting units. Each image capturing unit includes an image capturing pixel and a first micro lens. Each image detecting unit includes a detecting pixel and a second micro lens with various focal lengths. The image capturing pixels are for capturing an image. The first micro lens is disposed in front of the image capturing pixel. The detecting pixels are for focusing. The second micro lens is disposed in front of the detecting pixel. The image capturing units and the detecting units are arranged in a matrix. A length of at least one of the second micro lenses is different from that of another one of the second micro lenses. The focusing method comprises the following steps. A plurality of light beams passing through the lens module is provided. A focal point is calculated according to the detecting units by the computing unit. The lens module is controlled to move according to the focal point.

The above and other aspects of the disclosure will become better understood with regard to the following detailed description of the non-limiting embodiment(s). The following description is made with reference to the accompanying drawings.

BRIEF DESCRIPTION OF THE DRAWINGS

FIG. 3 shows the arrangement of the detecting pixels;
FIG. 4 shows the structure of the detecting pixels of FIG. 3;
FIG. 6 shows the arrangement of the detecting pixels according to another embodiment;
and
FIG. 7 shows the arrangement of the detecting pixels according to another embodiment.

DETAILED DESCRIPTION

Preferred embodiments are disclosed below for elaborating the invention. Various lengths, such as optical focus lengths or distances, of a plurality of micro lenses are applied on a plurality of detecting pixels, such that in an autofocus process, the time consumption can be reduced, and the accuracy can be improved. The following embodiments are for the purpose of elaboration only, not for limiting the scope of protection of the invention. Besides, secondary elements are omitted in the following embodiments to highlight the technical features of the invention.

Figure 1:
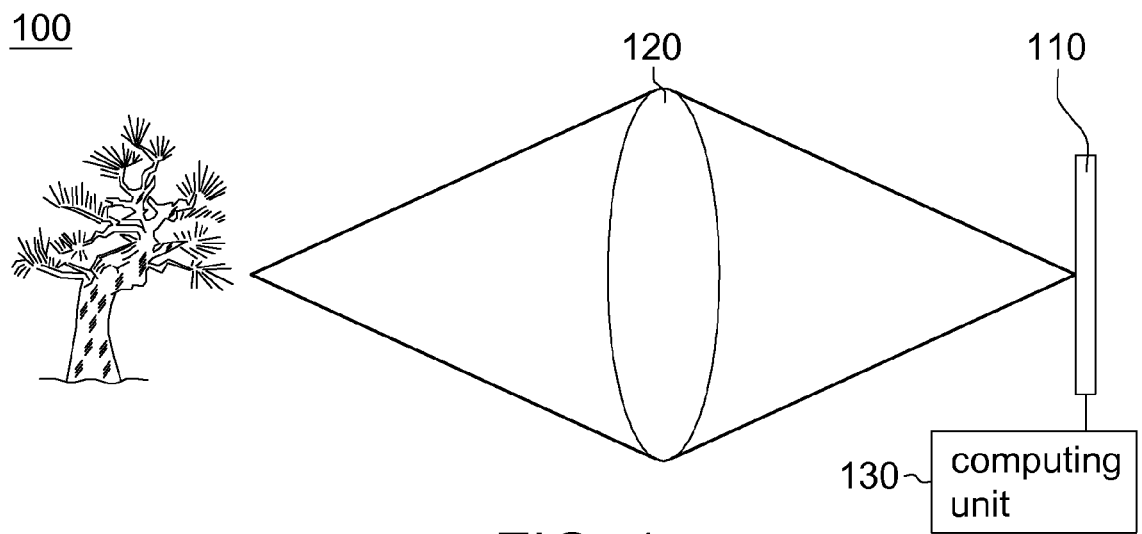
FIG. 1 shows an electric device.

Please refer to FIG. 1. FIG. 1 shows an electric device 100. The electric device 100 includes an image sensor 110 and a lens module 120. The electric device 100 can be a camera, a video recorder, a smart phone, a notebook computer or a web cam. The image sensor 110 can receive light beams from an object and passing through the lens module 120. The image sensor 110 can be a charge coupled device (CCD) or a complementary metal-oxide-semiconductor (CMOS). The lens module 120 may be zoomed in and/or zoomed out and focuses the light beams on the image sensor 110. The lens module 120 comprises at least one plastic lens or glass lens which can be a concave lens, a convex lens, a plane-convex lens, a plano-concave lens, a concavo-convex lens, or a combination thereof.

Figure 2:
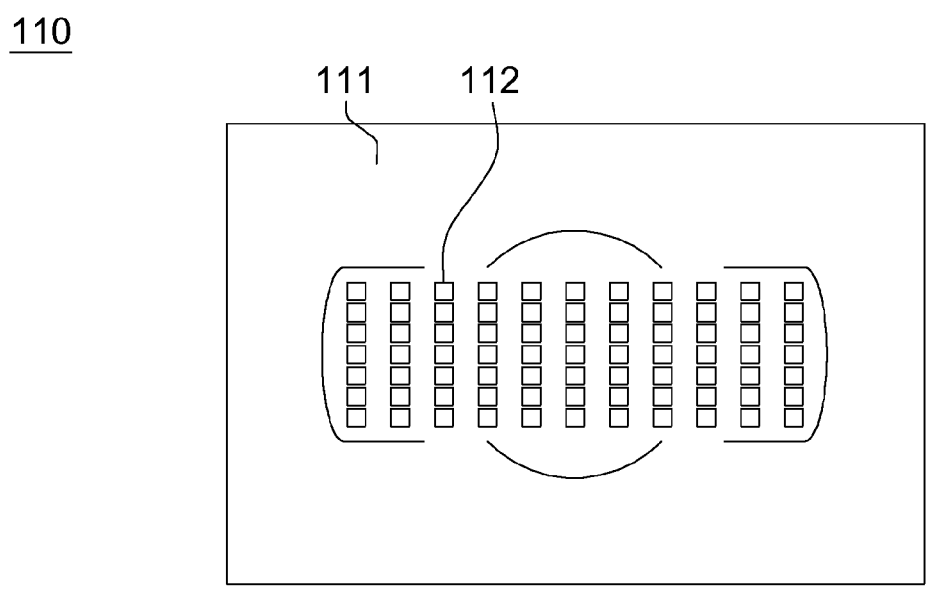
FIG. 2 shows the image sensor.

Please refer to FIG. 2. FIG. 2 shows the image sensor 110. The image sensor 110 includes a plurality of image capturing units 111 and a plurality of detecting units 112. The image capturing units 111 may capture an image in accordance with the light beams from the object. Moreover, in one embodiment, the image capturing units 111 and the detecting units 112 of the image sensor 110 may be alternated set, but it is not limit this invention. Each of the image capturing units 111 includes an image capturing pixel (not shown) and a first micro lens (not shown). A parts of the light beams of the object pass through the lens module 120 and the first micro lenses to be projected on the corresponding image capturing units 111 respectively. The characteristic, such as brightness or hue, of the light beams can be sensed by the image capturing units 111. Therefore, the characteristic of the light beams can be recorded and then the image of the object can be rebuilt according to the characteristic of the light beams.

The detecting units 112 may assist in focusing and preventing de-focus. Each of the detecting units 112 includes a detecting pixel 112c (shown in FIG. 4) and a second micro lens 112a (shown in FIG. 4). Another parts of the light beams of the object pass through the lens module 120 and the second micro lenses 112a to be project on the corresponding detecting pixels 112c respectively. When the image data is being detected by each detecting units 112, a computing unit 130 may process an error data from the detecting units 112 and provide an movement data of a focal point for the lens module 120 to be moved by a motor (not shown), such that the image sensor 110 can accurately capture the image of the object. In one embodiment, the computing unit 130 may adopt a digital signal processor (DSP) and/or a central processor unit (CPU) to calculate or look up a built-in table for providing the movement data of the focal point, wherein the built-in table comprises a plurality of movement data of the lens module 120 in comparison with the error data of the detecting units 112, but it is not limit this invention.

As shown in FIG. 2, the image capturing units 111 and the detecting units 112 are arranged in a matrix. In one embodiment, the ratio of number of the image capturing units 111 to that of the detecting units 112 may be between 10 (=10:1) and 1.5 (=6:4), such as 2.33 (=7:3), but it is not limit this invention.

In one embodiment, the light beams captured by the detecting units 112 can also provide pixel data of the image. Therefore, whole of the image sensor 110 can capture a whole image.

In one embodiment, the light beams captured by the detecting units 112 may not provide pixel data of the image. The pixels of the captured image can be compensated or calculated, such as a method of interpolation or extrapolation, through the adjacent pixels to provide pixels of a whole image by the computing unit 130.

Please refer to FIGS. 3 and 4. FIG. 3 shows the arrangement of the detecting units 112, and FIG. 4 shows the structure of the detecting units 112 of FIG. 3. In the present embodiment, in each row, a length 112d of the second micro lenses 112a defined from an outer surface of the second micro lenses 112a to the corresponding optical sensing pixels 112c is different from that of another one of the second micro lenses 112a, wherein, the lengths 112d may be optical focus lengths or distances. The second micro lenses 112a have more than or equal to three kinds of lengths 112d. For example, as shown in FIGS. 3 and 4, the second micro lenses 112a have eleven kinds of lengths 112d. In this matrix, the lengths 112d of the second micro lenses 112a labeled "−5", "−4", "−3", "−2", "−1", "0", "1", "2", "3", "4" and "5" are increased. In the present embodiment, a reference plane is defined in front of the image capturing pixel of the image capturing units 111. The first micro lenses of the image capturing units 111 are disposed on the reference plane. If the second micro lens 112a is disposed on the reference plane, then the length 112d thereof is labeled as "0." If the second micro lens 112a is set between the optical sensing pixel 112c and the reference plane by one unit distance, then the length 112d thereof is labeled as "−1"; otherwise, the length 112d thereof is labeled as "1". The similar rule can be analogized.

More detail, as shown in FIG. 4, each of the detecting units 112 further includes a light shield 112b. The light shield 112b blocks undesired light beam. The optical sending pixel 112c senses the light beams are projected on itself. Depend on the location of the object and the lens module 120, the light beams may be focused on one of the optical sensing pixels 112c labeled "−5", "−4", "−3", "−2", "−1", "0", "1", "2", "3", "4" and "5." According to the detection of the optical sensing pixels 112c of the detecting units 112, the focal point can be calculated by the computing unit 130. Moreover, in one embodiment, the image capturing units 111 and the detecting units 112 may be alternated set on the image sensor 110.

In one embodiment, as shown in FIG. 3, the lengths 112d of the second micro lenses 112a are increased along a first direction C1, and the lengths 112d of the second micro lenses 112a are the same along a second direction C2. That is to say, each kind of the detecting units 112 is arranged at one column where some of the image capturing unit 111 may be arranged.

Figure 5:
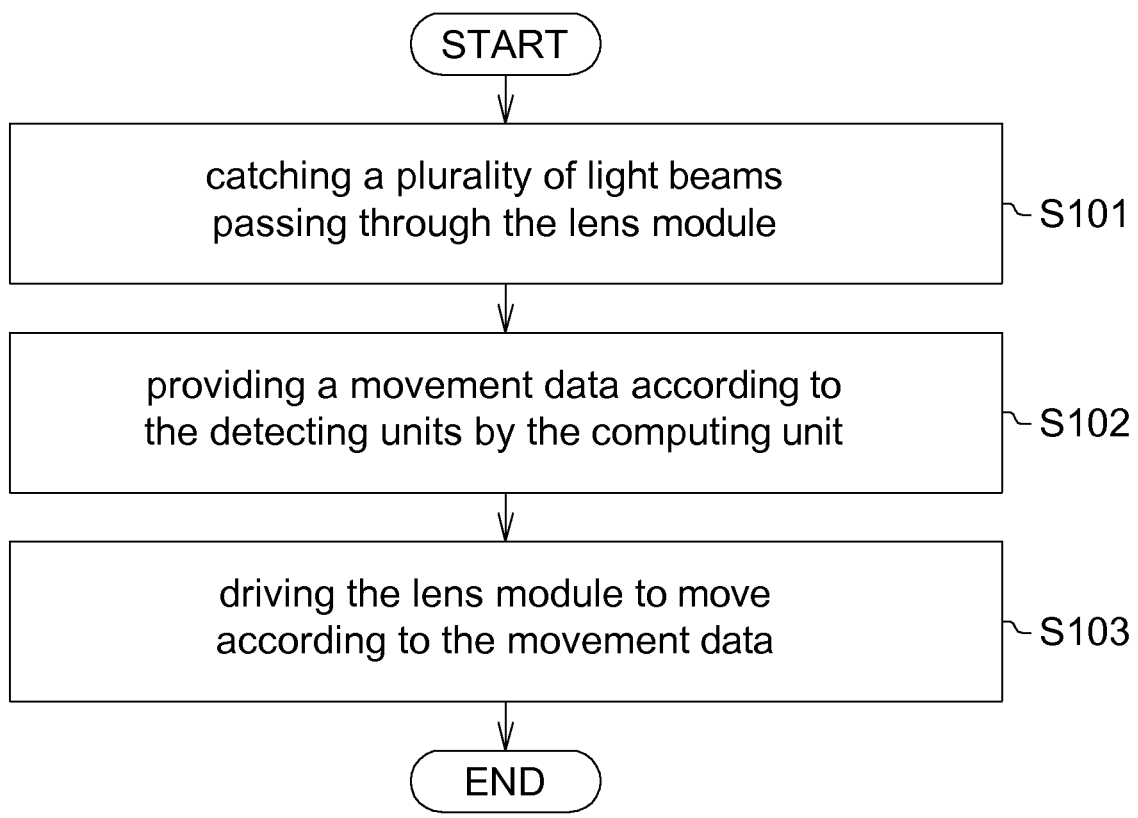
FIG. 5 shows flowchart of a focusing method of the electric device.

Please refer to FIG. 5. FIG. 5 shows flowchart of a focusing method of the electric device 100. In step S101, light beams from an object passing through the lens module 120 is granted by exposing. The light beams pass through the lens module 120 and reach the detecting units 112.

In step S102, the focal point is calculated according to the detecting units 112 by the computing unit 130. In one embodiment, the light beams may be focused on one of the detecting units 112 labeled "−5", "−4", "−3", "−2", "−1", "0", "1", "2", "3", "4" and "5."

In step S103, the lens module 120 is controlled to move according to the focal point. In one embodiment, the lens module 120 is moved according to a built-in table of the electric device 100 which shows the relationship between the needed movement data of the lens module 120 and the detection of the detecting units 112.

Because of using the various lengths of detecting units 112 for detecting an error data, such as the de-focus data, the accuracy of focus position of the lens module 120 can be improved. And, the lens module 120 can be moved quickly according to the built-in table without multiple and/or complex calculation, therefore the time consumption can be reduced, but it is not limited to this invention. In another embodiment, the electric device 100 also may set an additionally mathematical function which relates the detection of the detecting units 112 and the needed movement of the lens module 120 according to the focal point.

Figures 6, 7:
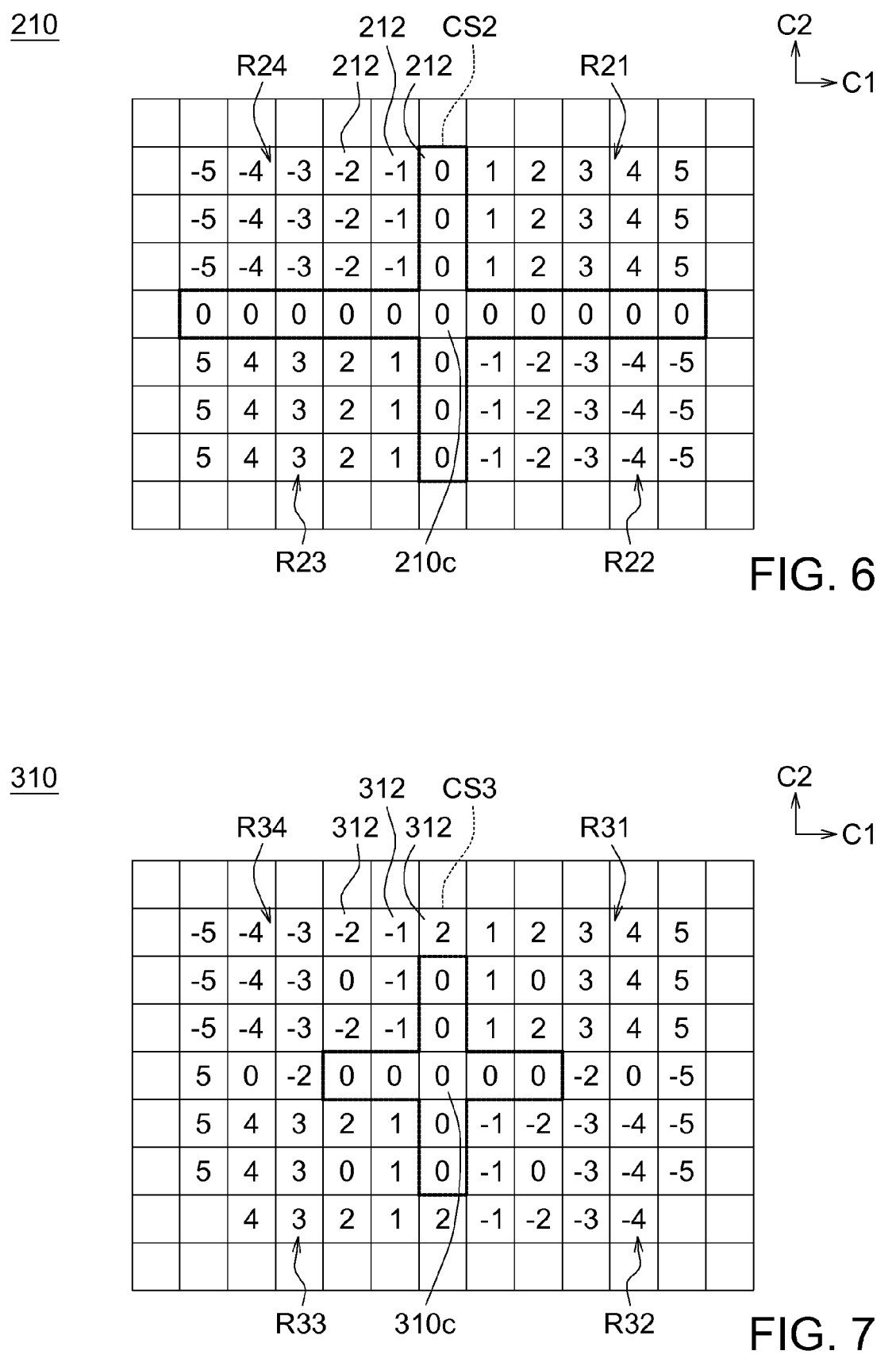

Please refer to FIG. 6. FIG. 6 shows the arrangement of the detecting units 212 according to another embodiment. As shown in FIG. 6, the some of the detecting units 212 which have the same lengths are arranged symmetrically to a center point 210c of the image sensor 210. For example, the detecting units 212 labeled "−2" are arranged symmetrically to the center point 210c of the image sensor 210. In another embodiment, a plurality of detecting units 212 can be disposed on a plurality of regions of the image sensor 210. It is to be understood that the disclosure is not limited thereto.

Further, some of the detecting units 212 whose length are the same, i.e. the detecting units 212 labeled "0", are arranged along the first direction C1 and the second direction C2 to from a cross shaped structure CS2.

Moreover, the cross shaped structure CS2 divides the image sensor 210 into four regions R21, R22, R23 and R24, the length of each detecting units 212 which is arranged in two diagonal regions R21 and R23, i.e. each of the detecting units 212 labeled "1", "2", "3", "4" and "5" from left to right in the first direction C1, is larger than that of each detecting units 212 which is arranged in the other two diagonal regions R22 and R24, i.e. each of the detecting units 212 labeled "−5", "−4", "−3", "−2" and "−1" from left to right in the first direction C1. And, each detecting units 212 of regions R21, R22, R23 and R24 which is arranged at the same column along the second direction C2 has the same length. In one embodiment, the image capturing units 111 and the detecting units 212 may be alternated set on the image sensor 210.

Please refer to FIG. 7. FIG. 7 shows the arrangement of the detecting units 312 according to another embodiment. As shown in FIG. 3, the some of the detecting units 312 whose lengths are the same are arranged symmetrically to a center point 310c of the image sensor 310. For example, the detecting units 312 labeled "0" are arranged symmetrically to the center point 310c of the image sensor 310. In another embodiment, a plurality of detecting units 312 can be disposed on a plurality of regions of the image sensor 310. It is to be understood that the disclosure is not limited thereto.

Moreover, refer to FIGS. 1 to 7, in one embodiment, an image sensor 110 comprises a plurality of image capturing units 111 and at least one detecting unit 112. Each image capturing unit 111 includes an image capturing pixel and a first micro lens, and each detecting unit 112 has a detecting pixel 112c and a second micro lens 112a. The first micro lens disposed in front of the image capturing pixel, and the second micro lens 112a disposed in front of the detecting pixel 112c. A length of the second micro lens 112a is different from a length of the first micro lenses. The lengths of the second micro lenses 112a may be linear changed in a first direction C1 and/or a second direction C2, and the image capturing units 111 and the detecting unit 112 may be arranged in a matrix.

Also, in one embodiment, an electric device 100 comprises an image sensor 110, a computing unit 130, a lens module 120 and a motor (not shown). The image sensor 110 includes a plurality of image capturing units 111 and a plurality of detecting units 112, and each image detecting unit 112 includes a second micro lens 112a. The image sensor 110 catches a plurality of light beams which passes through the lens module 120. The computing unit 130 provides a movement data of the lens module 120 by processing an error data, such as a de-focus data, from the detecting units 112. Then the computing unit 130 can ask the motor to drive the lens module 120 in accordance with the movement data. Wherein, the computing unit 130 may look up the built-in table which comprises the movement data in comparison with the error data.

Further, some of the detecting units 312 whose length are the same, i.e. the detecting pixels 312 labeled "0", are arranged along the first direction C1 and the second direction C2 to from a cross shaped structure CS3. In the present embodiment, not all of the detecting units 312 labeled "0" are arranged to form the cross shaped structure CS3. Some of the detecting units 312 labeled "0" are arranged in region R31, R32, R33 and R34. In one embodiment, the image capturing units 111 and the detecting units 312 may be alternated set on the image sensor 310.

While the disclosure has been described by way of example and in terms of the exemplary embodiment(s), it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An image sensor, comprising:
a plurality of image capturing units, each having an image capturing pixel and a first micro lens; and
at least two detecting units, each having a detecting pixel and a second micro lens, wherein
a distance between the detecting pixel and the second micro lens of one of the detecting units, a distance between the detecting pixel and the second micro lens of another one of the detecting units, and a distance between each of the image capturing pixels and each of the first micro lenses are different,
a plurality of first incident light beams passing through the first micro lenses are focused at a first plane,
a second incident light beam passing through one of the second micro lenses is focused at a second plane,
a third incident light beam passing through another one of the second micro lenses is focused at a third plane, and
the first plane, the second plane and the third plane are different.

2. The image sensor according to claim 1, wherein the image capturing units and the detecting units are arranged in a matrix.

3. The image sensor according to claim 1, wherein a plurality of lengths of the detecting units change linearly in a first direction, or in a second direction different from the first direction.

4. The image sensor according to claim 3, wherein the detecting units have two or more kinds of lengths, and the lengths of the detecting units are increased along the first direction.

5. The image sensor according to claim 3, wherein the lengths of the detecting units are the same along the second direction.

6. The image sensor according to claim 3, wherein some of the detecting units whose lengths are the same are arranged symmetrically with respect to a center point of the image sensor.

7. The image sensor according to claim 3, wherein some of the detecting units whose lengths are the same are arranged along the first direction and the second direction to form a cross-shaped structure.

8. The image sensor according to claim 7, wherein the cross-shaped structure divides the image sensor into four regions, and the length of each detecting unit which is arranged in two diagonal regions is larger than that of each detecting unit which is arranged in the other two diagonal regions.

9. An electric device comprising the image sensor claimed in claim 1.

10. An electric device, wherein the electric device has a lens module, and the electric device comprises:
an image sensor, comprising a plurality of image capturing units and a plurality of detecting units, each image capturing unit having an image capturing pixel and a first micro lens, each detecting unit having a detecting pixel and a second micro lens, the detecting units having different lengths, incident light beams passing through at least two of the second micro lenses and one of the first micro lenses being focused at different planes; and a computing unit, providing movement data in accordance with error data from the detecting units.

11. The electric device according to claim 10, wherein the lens module is moved according to the movement data.

12. The electric device according to claim 10, wherein the lengths of the detecting units are linear changed with the same slope.

13. The electric device according to claim 12, wherein the lengths of the detecting units are increased along a first direction, or are the same along a second direction different from the first direction.

14. The electric device according to claim 10, wherein some of detecting units whose lengths are the same are arranged symmetrically with respect to a center point of the image sensor.

15. The electric device according to claim 10, wherein a first group of the detecting units whose lengths are the same are arranged along a first direction and a second group of the detecting units whose lengths are the same are arranged in a second direction different from the first direction, to form a cross-shaped structure.

16. The electric device according to claim 15, wherein the cross-shaped structure divides the image sensor into four regions, and the length of each detecting unit that is arranged in two diagonal regions is larger than the length of each detecting unit that is arranged in the other two diagonal regions.

17. A focusing method of an electric device, wherein the electric device comprises an image sensor, a computing unit and a lens module, the image sensor has a plurality of image capturing units and a plurality of detecting units, each image capturing unit has a first micro lens, and each detecting unit has a second micro lens, the focusing method comprising:

catching a plurality of incident light beams passing through the lens module by the image sensor, wherein the incident light beams passing through one of the first micro lenses, one of the second micro lenses and another one of the second micro lenses are focused at different planes;

providing movement data according to the detecting units by the computing unit; and driving the lens module to move according to the movement data.

18. The focusing method of the electric device according to claim 17, wherein a plurality of lengths of the detecting units are linearly changed in a first direction, or in a second direction different from the first direction.

19. The focusing method of the electric device according to claim 18, wherein some of the detecting units whose lengths are the same are arranged symmetrically with respect to a center point of the image sensor.

20. The image sensor according to claim 18, wherein a first group of the detecting units whose lengths are the same are arranged along the first direction and a second group of the detecting units whose length are the same are arranged in the second direction, to form a cross-shaped structure, and the cross-shaped structure divides the image sensor into four regions, and the length of each detecting unit that is arranged in two diagonal regions, is larger than the length of each second micro lens that is arranged in the other two diagonal regions.

* * * * *